(12) United States Patent
Brock et al.

(10) Patent No.: US 6,701,950 B2
(45) Date of Patent: Mar. 9, 2004

(54) FUEL TANK VENT SYSTEM

(75) Inventors: Michael S. Brock, Connersville, IN (US); J. Bradley Groom, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 84 days.

(21) Appl. No.: 10/115,798

(22) Filed: Apr. 3, 2002

(65) Prior Publication Data

US 2002/0144730 A1 Oct. 10, 2002

Related U.S. Application Data (60) Provisional application No. 60/282,622, filed on Apr. 9, 2001.

(51) Int. Cl.[7] .............................................. F16K 24/04
(52) U.S. Cl. ........................................ 137/43; 137/202
(58) Field of Search .................................... 137/43, 202

(56) References Cited

U.S. PATENT DOCUMENTS

| | | | |
|---|---|---|---|
| 4,781,218 A | 11/1988 | Mori et al. | |
| 5,443,561 A | 8/1995 | Sakata et al. | |
| 5,577,526 A * | 11/1996 | Kasugai et al. | 137/202 |
| 5,582,198 A | 12/1996 | Nagino et al. | |
| 5,687,756 A * | 11/1997 | VanNatta et al. | 137/202 |
| 5,711,339 A * | 1/1998 | Kurihara | 137/202 |
| 5,775,362 A | 7/1998 | Sato et al. | |
| 5,954,082 A | 9/1999 | Waldorf et al. | |
| 6,035,884 A * | 3/2000 | King et al. | 137/202 |
| 6,240,950 B1 | 6/2001 | Harris | |
| 6,425,379 B2 * | 7/2002 | Shimamura et al. | 137/202 |

* cited by examiner

Primary Examiner—Gerald A. Michalsky
(74) Attorney, Agent, or Firm—Barnes & Thornburg (57) ABSTRACT

A vent apparatus is adapted for use with a fuel tank to control venting of fuel vapor from the fuel tank. The vent apparatus comprises a fuel vapor vent outlet to discharge fuel vapor from the fuel tank. The vent apparatus comprises a normally open first valve module to serve as a fuel fill limit valve and close when the liquid level in the tank reaches a predetermined fill limit and a normally open second valve module to serve as a fuel fill limit valve and close when the liquid level in the tank reaches the predetermined fill limit. The first valve module and the second valve module cooperate to block communication between the fuel tank and the fuel vapor vent outlet when the vent apparatus is positioned in a non-tilted orientation relative to a horizontal and the level of liquid fuel in the fuel tank reaches the predetermined fill limit to close both valve modules.

19 Claims, 5 Drawing Sheets

FUEL TANK VENT SYSTEM

This application claims priority under 35 U.S.C. 119(e) to U.S. Provisional Application Ser. No. 60/282,622, filed Apr. 9, 2001, which is hereby incorporated by reference herein.

BACKGROUND AND SUMMARY

The present invention relates to a vent apparatus, and particularly to a vent apparatus for regulating discharge of liquid fuel and fuel vapor from a fuel tank.

Vehicle fuel systems include fuel tanks and various valves for venting pressurized fuel vapor from the tank to a fuel vapor recovery canister onboard the vehicle. Roll-over valves and fill-limit valves are examples of fuel system valves included in vehicle fuel systems.

Fuel vapor is generated in the fuel tank during operation of the vehicle, for example, by evaporation or by sloshing of the liquid fuel against the walls of the fuel tank. Excessive pressure can build up in the fuel tank unless fuel system valves are provided to vent fuel vapor from the fuel tank in certain circumstances. Each fuel system valve is movable between an opened position allowing fuel vapor to vent from the fuel tank through a tank vent outlet and a closed position blocking fuel vapor from venting from the fuel tank through the tank vent outlet.

According to the present disclosure, a vent apparatus is adapted for use with a fuel tank to control venting of fuel vapor from the fuel tank. The vent apparatus comprises a fuel vapor vent outlet to discharge fuel vapor from the fuel tank. The vent apparatus comprises a normally open first valve module to serve as a fuel fill limit valve and close when the liquid level in the tank reaches a predetermined fill limit and a normally open second valve module to serve as a fuel fill limit valve and close when the liquid level in the tank reaches the predetermined fill limit. The first valve module and the second valve module cooperate to block communication between the fuel tank and the fuel vapor vent outlet when the vent apparatus is positioned in a non-tilted orientation relative to a horizontal and the level of liquid fuel in the fuel tank reaches the predetermined fill limit to close both valve modules.

According to another aspect of the disclosure, the vent apparatus has a housing having the fuel vapor vent outlet to discharge fuel vapor from the fuel tank, a first lower fuel vapor vent aperture, and a second upper fuel vapor vent aperture. The first valve module is a lower roll-over valve module associated with the lower fuel vapor vent aperture. The second valve module is an upper roll-over valve module associated with the upper fuel vapor vent aperture. The lower roll-over valve module and the upper roll-over valve module are movable between a fill-limit orientation and a venting orientation. In the fill-limit orientation, the lower roll-over valve module and the upper roll-over valve module cooperate to block communication between the fuel tank and the fuel vapor vent outlet through the lower fuel vapor vent aperture and the upper fuel vapor vent aperture when the level of liquid fuel in the fuel tank rises to a predetermined fill limit. In the venting orientation, the lower roll-over valve module blocks communication between the fuel tank and the fuel vapor vent outlet through the lower fuel vapor vent aperture and the upper roll-over valve module allows fuel vapor to flow from the fuel tank through the upper fuel vapor vent aperture to the fuel vapor vent outlet.

According to another aspect of the disclosure, the housing further has a first chamber, a second chamber, a third chamber, and a liquid fuel transfer aperture for communication of liquid fuel between the first chamber and the third chamber. The first valve module is positioned for movement in the first chamber between an opened position allowing fuel vapor to flow from the first chamber through the first fuel vapor vent aperture to the second chamber for discharge through the fuel vapor vent outlet and a closed position blocking fuel from flowing from the first chamber through the first fuel vapor vent aperture to the second chamber. The second valve module is positioned for movement in the third chamber from an opened position allowing fuel vapor to flow from the third chamber through the second fuel vapor vent aperture to the second chamber for discharge through the fuel vapor vent outlet to a closed position blocking fuel from flowing from the third chamber through the second fuel vapor vent aperture to the second chamber in response to liquid fuel flowing from the first chamber through the liquid fuel transfer aperture to the third chamber.

Additional features of the disclosure will become apparent to those skilled in the art upon consideration of the following detailed description of illustrative embodiments exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1:
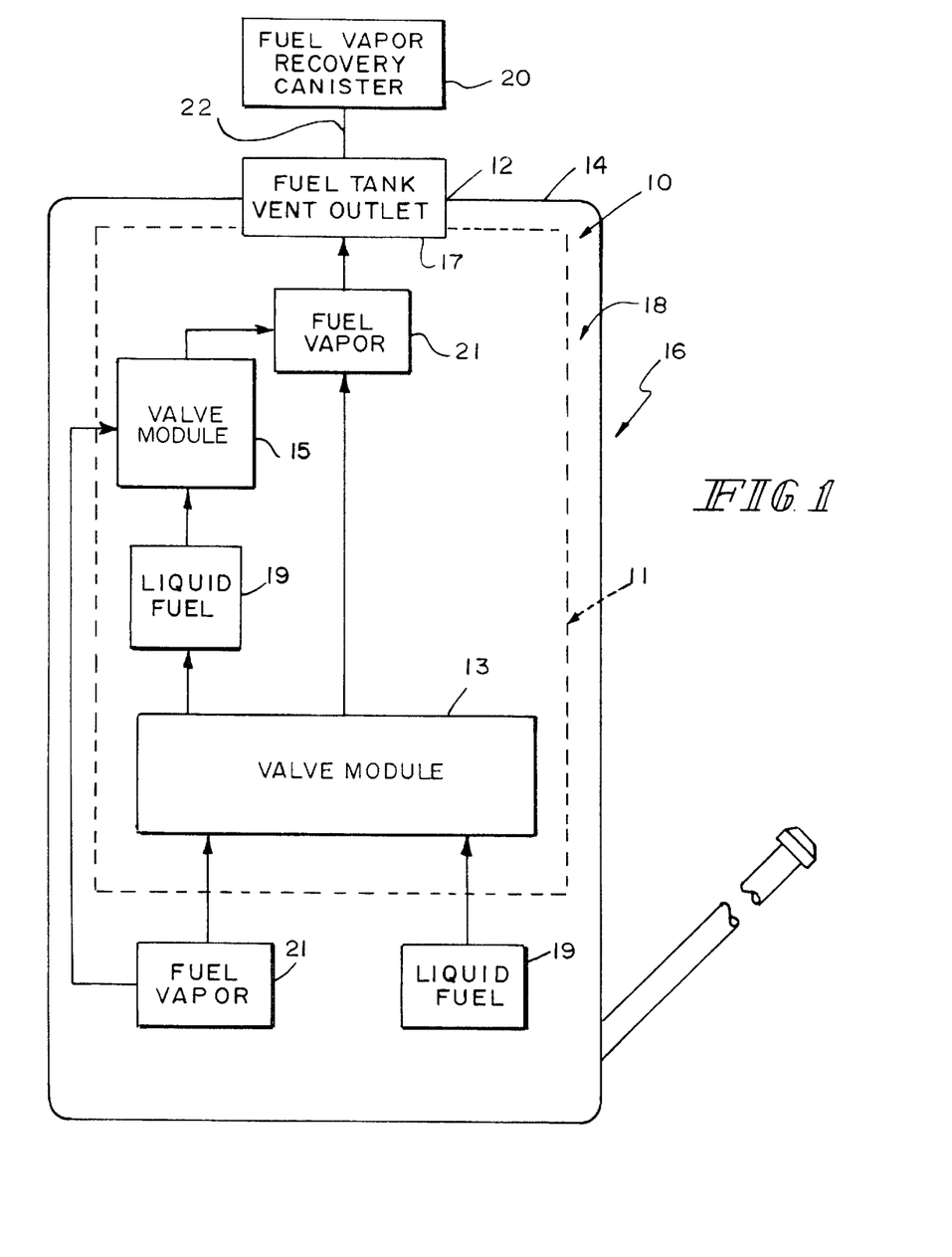
FIG. 1 is a block diagram of a vent apparatus located in a fuel tank to regulate discharge of fuel vapor from the tank to a destination outside of the tank.
Figure 2:
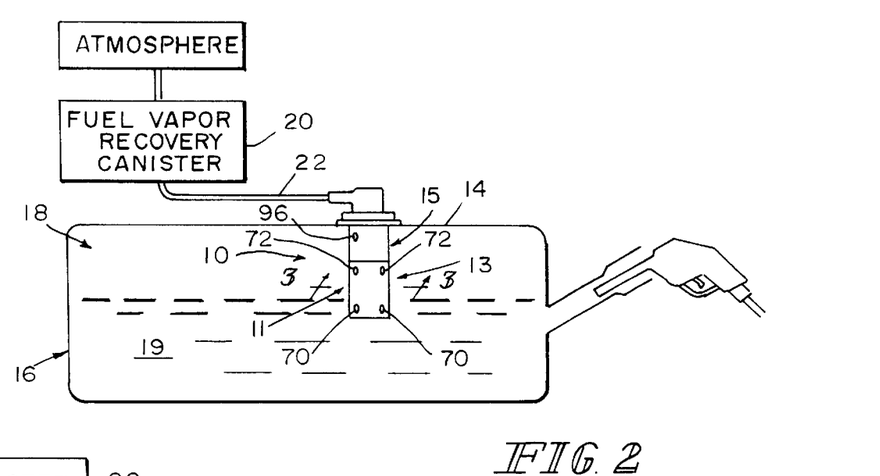
FIG. 2 is a diagrammatic view of a fuel tank during refueling and a fuel vapor recovery canister outside the tank and showing a vent apparatus in a non-tilted orientation and containing a pair of valve modules mounted to a top wall of the fuel tank.
Figure 3:
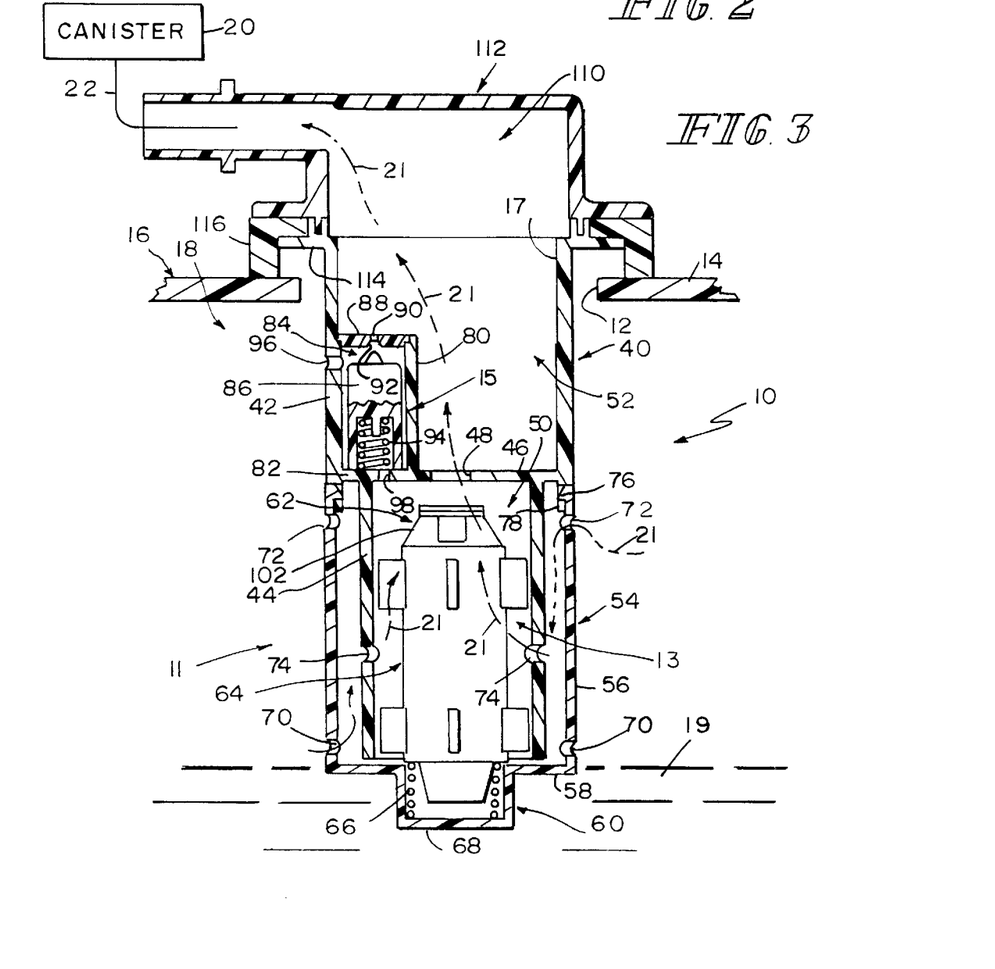
FIG. 3 is a sectional view taken along line 3—3 of FIG. 2 showing the vent apparatus in the non-titled orientation and mounted in an aperture formed in the top wall of the fuel tank, the vent apparatus including a lower valve module in a lower chamber of a stand pipe to receive liquid fuel and fuel vapor from the fuel tank and an upper valve module in an upper chamber of the stand pipe to receive liquid fuel from the lower chamber and fuel vapor from the fuel tank.

A vent apparatus 10 is mounted in an aperture 12 formed in a top wall 14 of a fuel tank 16 to regulate flow of pressurized fuel vapor from a vapor space 18 provided in tank 16 to a fuel vapor recovery canister 20 through a discharge conduit 22, as shown, for example, in FIGS. 1–3. Vent apparatus includes a lower valve module 13 and an upper valve module 15 interposed between module 13 and a fuel tank venting outlet or fuel vapor vent outlet 17 provided in vent apparatus 10 as shown diagrammatically in FIG. 1.

Modules 13, 15 cooperate to block communication between fuel tank 16 and outlet 17 when the level of liquid fuel in the fuel tank reaches a predetermined fill limit and so both modules 13, 15 can be referred to as fuel fill-limit valves. Modules 13, 15, in their capacity as fill-limit valves, move to closed positions when the level of liquid fuel in fuel tank 16 rises to a predetermined fill limit during refueling. Modules 13, 15 are part of a fill-limit control system that functions to vent fuel vapor from vapor space 18 in the fuel tank 16 during early stages of refueling but block introduction of liquid fuel into the fuel tank 16 once the fuel tank 16 is filled to its maximum rated capacity with liquid fuel so as to preserve a minimum volume of vapor space 18 in the fuel tank 16. The fuel tank 16 is thus not completely filled with liquid fuel during refueling. Rather, at least a predetermined portion of the space inside the fuel tank 16 above the liquid fuel is left for liquid fuel and fuel vapor expansion.

Modules 13, 15 are "roll-protected" to block communication between fuel tank 16 and outlet 17 when apparatus 10 is tilted a preselected amount. Thus, both modules 13, 15 can also be referred to as roll-over valves or valve modules. Modules 13, 15, in their capacity as roll-over valve modules, move to their closed positions to block liquid fuel from exiting the fuel tank 16 through tank vent outlet 17 when the vehicle carrying them is tilted a preselected amount or is rolled over in an accident. When disposed in their normally opened positions, modules 13, 15 allow pressurized fuel vapor to vent from the tank 16.

Vent apparatus 10 further includes a housing 11 sized to receive modules 13, 15 therein as shown diagrammatically in FIG. 1. Housing 11 is configured to allow liquid fuel 19 and fuel vapor 21 to flow from an interior region of fuel tank 16 into a lower interior chamber 50 containing module 13 and to allow fuel vapor 21 to flow from an interior region of fuel tank 16 into an upper interior chamber 84 containing module 15. Valve modules 13, 15 operate using liquid fuel 19 admitted first from the interior region of fuel tank 16 into chamber 50 to control discharge of fuel vapor 21 from housing 11 to fuel vapor recovery canister 20 (or other destination outside of fuel tank 16) through fuel tank venting outlet 17.

Housing 11 includes a vertical conduit 40 having an upper portion 42 providing fuel tank venting outlet 17, a lower portion 44 supported in the interior region of fuel tank 16 below upper portion 42, and a partition wall 46 arranged at the junction of the upper and lower portions 42, 44, as illustrated in FIG. 3. Partition wall 46 is formed to include a fuel vapor vent aperture 48 located to pass fuel vapor 21 from chamber 50 formed in lower portion 44 to chamber 52 formed in upper portion 42.

In the embodiment illustrated in FIG. 3, housing 11 further includes an outer shell 54 including an outer sleeve 56, an annular plate 58 coupled to a lower edge of outer sleeve 56, and a receiver 60 depending from an inner edge of annular plate 58. Outer shell 54 and lower portion 44 cooperate to provide a lower region of housing 11. Interior chamber 50 contains a vent valve 62 and a buoyant float 64 which cooperate to provide a float valve for module 13. A compression spring 66 is disposed in receiver 60 and acts between float 64 and a plate 68 in receiver 60 to assist in lifting float 64 within chamber 50 as the fuel level rises therein. Valve 62, float 64, and spring 66 cooperate to close aperture 48 and provide valve module 13.

Outer sleeve 56 is formed to include lower ports 70 adjacent to annular plate 58 and upper ports 72 adjacent to partition wall 46 as shown in FIG. 3. Lower portion 44 of vertical conduit 40 is formed to include ports 74 as also shown in FIG. 3. Ports 70, 72, 74 are sized to allow liquid fuel 19 and fuel vapor 21 to flow therethrough at various times during operation of vent apparatus 10.

It is within the scope of this disclosure to configure housing 11 without using outer shell 54. In such an embodiment, annular plate 58 is coupled to a lower edge of lower portion 44 and outer sleeve 56 is not used. Outer shell 54 further includes connectors 76 located along an upper edge of outer sleeve 56 and configured to engage apertures formed in an annular flange 78 depending from upper portion 42 and lying below partition wall 46 to support outer sleeve 56 in a fixed position under and relative to upper portion 42. It is within the scope of this disclosure to configure the lower region of housing 11 like the enclosures for the valves of the vent apparatus disclosed in U.S. Patent Application No. 10/094,058 filed on Mar. 8, 2002, now U.S. Pat. No. 6,578,597 the disclosure of which is hereby incorporated by reference herein.

As shown in FIG. 3, vertical conduit 40 further includes a vertical wall 80 positioned above partition wall 46. Vertical wall 80, a section of upper portion 42, and a section 82 of partition wall 46 cooperate to define a valve chamber 84 containing a buoyant float valve 86. A lid 88 of housing 11 provides a ceiling for valve chamber 84 and includes a fuel vapor vent aperture 90 and a conical valve seat 92 around vent aperture 90. A compression spring 94 is disposed in a space formed in float valve 86 and acts between float valve 86 and section 82 of upper portion 42 to assist in lifting float valve 86 within chamber 84 as the fuel level rises therein. Float valve 86 and spring 94 cooperate to close aperture 90 and provide module 15.

Upper portion 42 of vertical conduit 40 is illustratively formed to include a port 96 shown, for example, in FIGS. 2 and 3. Port 96, chamber 84, and vent aperture 90 cooperate to form a fuel vapor passageway for venting fuel vapor from the interior region of fuel tank 16 to canister 20 past module 15 and through chamber 52 and vent outlet 17 when valve 86 is disposed in a lowered position opening vent aperture 90. This fuel vapor vent passageway 96, 84, 90 is blocked whenever liquid fuel passes from chamber 50 into valve chamber 84 (through, for example, an aperture 98 formed in section 82 of partition wall 46) and moves valve 86 upwardly to assume a raised position engaging valve seat 92 and closing vent aperture 90 as shown, for example, in FIG. 5a.

During normal vehicle operating conditions, as shown, for example, in FIGS. 2 and 3, vent apparatus 10 is positioned in a generally non-tilted orientation and fuel vapor 21 flows from fuel tank 16 into chamber 50 through ports 70, 72 and is discharged from chamber 50 into interior chamber 52 through vent aperture 48. Fuel vapor 21 can also flow from fuel tank 16 into chamber 84 through ports 98 and 96 and is discharged from chamber 84 into interior chamber 52 through vent aperture 90. Fuel vapor 21 then flows from interior chamber 52 through tank venting outlet 17 into a passageway 110 formed in cap 112 and coupled to discharge conduit 22.

Cap 112 is coupled to an upper end 114 of upper portion 42 to trap a mount ring 116 therebetween, as shown, for example, in FIG. 3. Mount ring 116 is made of a weldable plastics material such as high density polyethylene (HDPE) so that it can be welded to top wall 14 of tank 16 (also made of HDPE) to retain vertical conduit 40 in a fixed position extending through tank aperture 12. It is within the scope of this disclosure to retain vertical conduit 40 in a fixed position in tank aperture 12 using any suitable means.

Figure 4:
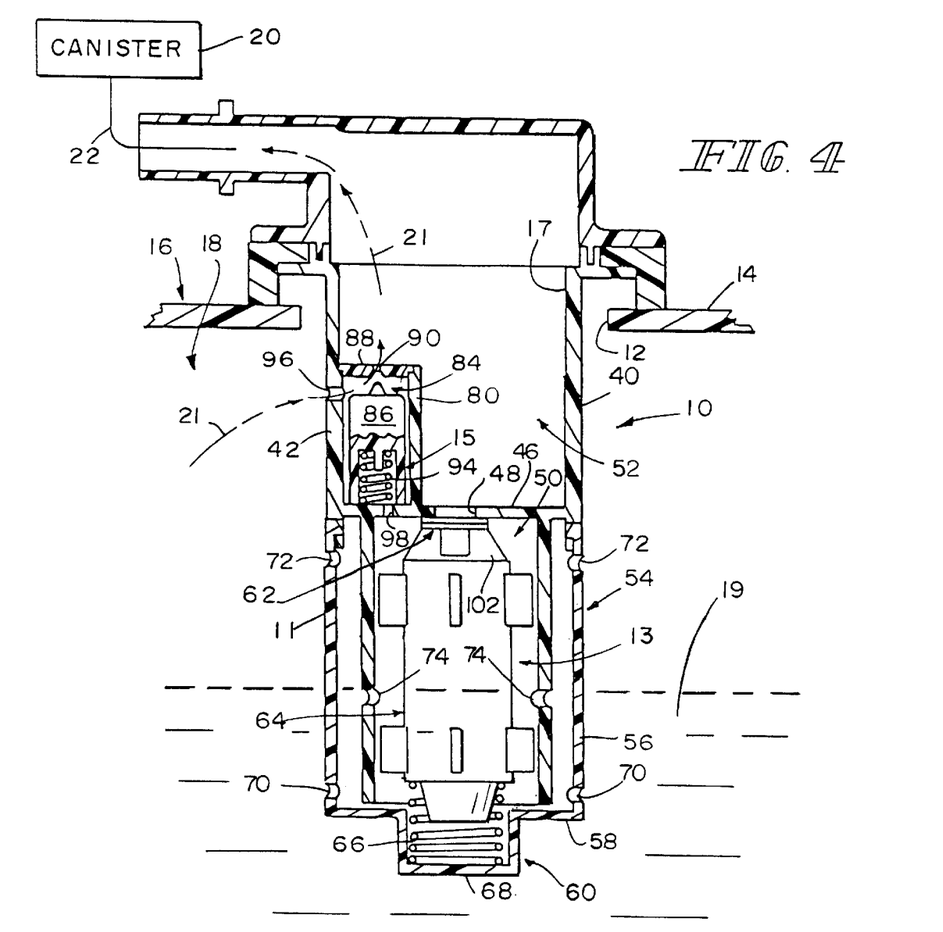
FIG. 4 is a sectional view similar to FIG. 3 showing that the level of liquid fuel in the fuel tank has risen to enter the lower chamber and lift the lower valve module therein to a vent-closing position while a small amount of fuel vapor vents from the fuel tank through a vent passageway containing the upper valve module.
Figure 5A:
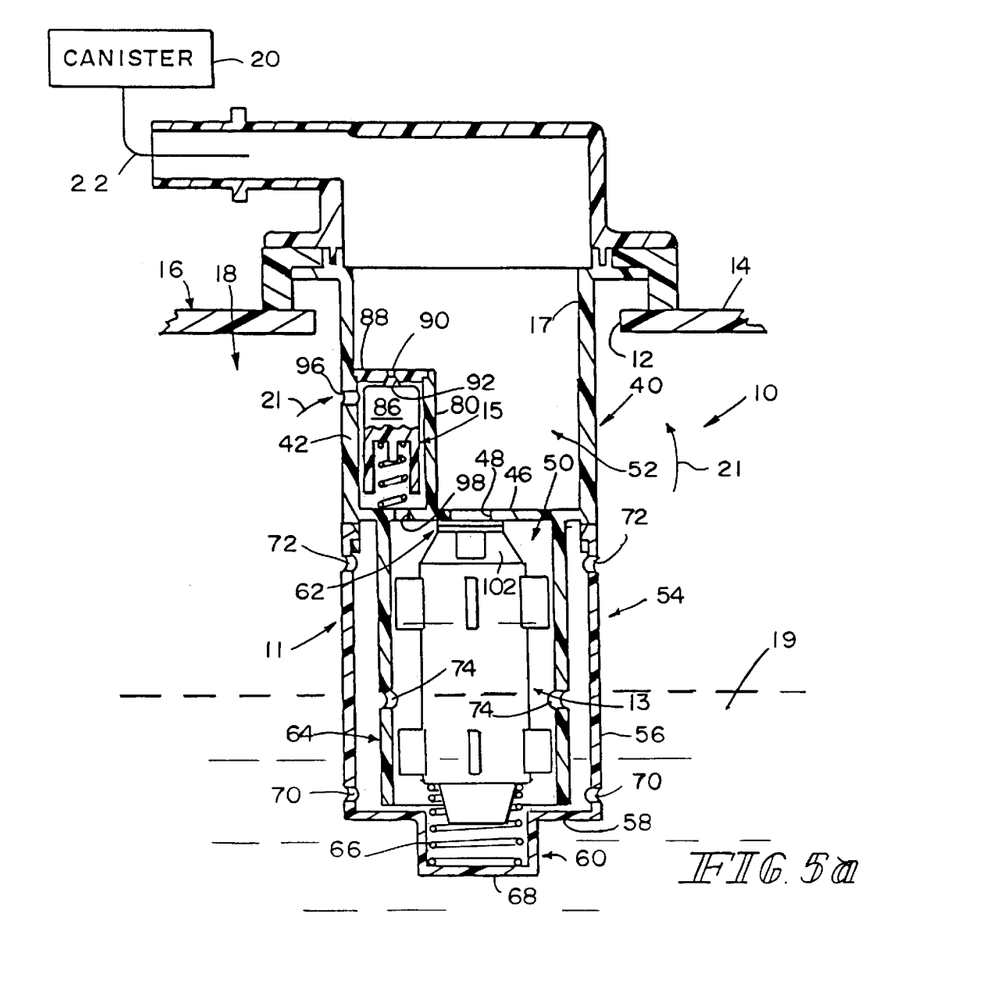
FIG. 5a is a sectional view similar to FIGS. 3 and 4 showing that liquid fuel has filled the lower chamber and passed into the upper chamber to lift the upper valve module to a position closing the vent passageway.

Near the end of a tank refueling cycle, liquid fuel 19 rises to the level shown in FIG. 4 to raise buoyant float 64 upwardly in chamber 50 to cause valve 62 to move to assume a raised position closing vent aperture 48. Further refueling causes liquid fuel to rise in chamber 50 past frusto-conical portion 102 and through aperture 98 into chamber 84 causing float valve 86 to move to a raised position closing vent aperture 90, as illustrated in FIG. 5a. Float valve 86 is closed at the end of the tank refueling cycle to preserve the fill-limit function associated with module 13 and the fill-limit control system onboard the vehicle. This maintains tank pressure and vapor space closure so as to block overfilling of the tank.

Valve 86 and valve 62 reopen after completion of the tank refueling process. At the end of refueling, the pressure in fuel tank 18 is somewhat greater than the pressure in chamber 84 and the liquid fuel level in vent apparatus 10 is somewhat greater than the liquid fuel level in fuel tank 18. After refueling is completed, fuel tank 18 communicates with chamber 84 through port 96 to equalize the pressure in fuel tank 18 and chamber 84 and allow the level of liquid fuel in vent apparatus 10 to recede to the level of liquid fuel in fuel tank 18 thereby reopening valve 86 and valve 62.

Figure 5B:
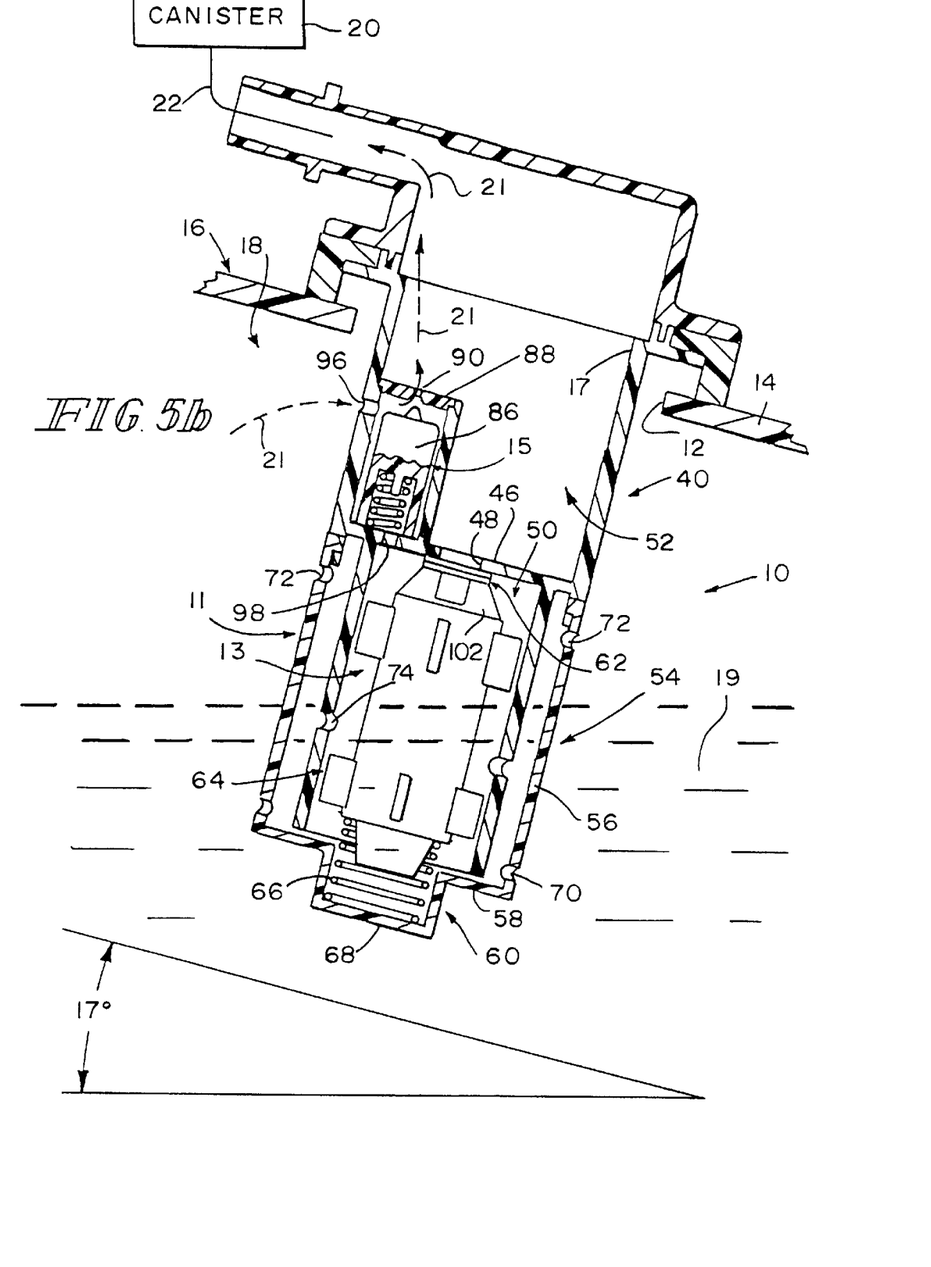
FIG. 5b is a sectional view similar to FIGS. 3, 4, and 5a showing the vent apparatus and fuel tank in a tilted orientation with respect to a horizontal to cause liquid fuel in the lower chamber to move the valve module therein to a closed position yet allow the upper valve module in the upper chamber to remain in an opened position venting fuel vapor from the fuel tank through the vent passageway to the tank venting outlet.

Referring now to FIG. 5b, vent apparatus 10 is positioned in a tilted orientation. Modules 13, 15 are arranged in series in a fuel tank stand tube 40 so that module 15 is higher in stand tube 40 than module 13. By thus interposing module 15 between module 13 and tank venting outlet 17, module 15 can continue to vent fuel vapor 21 from tank 16 to canister 20 through vent passageway 96, 84, 90, chamber 52, cap passageway 110, and discharge conduit 22, even though vent apparatus 10 is tilted (e.g., 17 degrees with respect to the horizontal) when a vehicle (not shown) containing vent apparatus 10 is parked on a 17 degree grade.

Although the present disclosure has been described and defined in detail, variations and modifications exist within the scope and spirit of the disclosure as described and defined herein.

What is claimed is:

1. A vent apparatus adapted for use with a fuel tank to control venting of fuel vapor from the fuel tank, the vent apparatus comprising
    a housing having a fuel vapor vent outlet to discharge fuel vapor from the fuel tank, a lower chamber, an upper chamber located above the lower chamber, a first fuel vapor vent aperture to discharge fuel vapor from the lower chamber, a second fuel vapor vent aperture to discharge fuel vapor from the upper chamber, and a liquid fuel transfer aperture extending from the lower chamber to the upper chamber to conduct liquid fuel therebetween
    a normally open first valve module positioned in the lower chamber to serve as a fuel fill limit valve and close the first fuel vapor vent aperture to block communication of fuel vapor from the fuel tank through the first fuel vapor vent aperture to the fuel vapor vent outlet, and
    a normally open second valve module positioned in the upper chamber to serve as a fuel fill limit valve and responsive to passage of liquid fuel from the lower chamber through the liquid fuel transfer aperture to the upper chamber to close the second fuel vapor vent aperture to block communication of fuel vapor from the fuel tank through the second fuel vapor vent aperture to the fuel vapor vent outlet to cooperate with closure of the first valve module to establish a fill limit of liquid fuel in the fuel tank.

2. The vent apparatus of claim 1, wherein the second valve module is interposed between the first valve module and the fuel vapor vent outlet in series with the first valve module.

3. The vent apparatus of claim 1, further comprising a housing adapted to be coupled to the fuel tank, the housing having the fuel vapor vent outlet, a first chamber for the first valve module, and a second chamber for the second valve module.

4. The vent apparatus of claim 3, wherein the housing has an outer wall surrounding the first valve module and the second valve module, and the outer wall has a first port for communication between the fuel tank and the first chamber and a second port for communication between the fuel tank and the second chamber.

5. A vent apparatus adapted for use with a fuel tank to control venting of fuel vapor from the fuel tank, the vent apparatus comprising:
    a fuel vapor vent outlet to discharge fuel vapor from the fuel tank,
    a normally open first valve module to serve as a fuel fill limit valve and close when the liquid level in the tank reaches a predetermined fill limit, and
    a normally open second valve module to serve as a fuel fill limit valve and close when the liquid level in the tank reaches the predetermined fill limit, the first valve module and the second valve module cooperating to block communication between the fuel tank and the fuel vapor vent outlet when the vent apparatus is positioned in a non-tilted orientation relative to a horizontal and the level of liquid fuel in the fuel tank reaches the predetermined fill limit to close both valve modules, further comprising a housing adapted to be coupled to the fuel tank, the housing having the fuel vapor vent outlet, a first chamber for the first valve module, and a second chamber for the second valve module, wherein the housing has a first wall and a second wall, the first wall has a first fuel vapor vent aperture associated with the first valve module and the first chamber and a liquid fuel transfer aperture associated with the first chamber and the second chamber, and the second wall has a second fuel vapor vent aperture associated with the second valve module and the second chamber.

6. The vent apparatus of claim 5, wherein the first wall has a first valve seat including the first fuel vapor vent aperture for the first valve module, and the second wall has a second valve seat including the second fuel vapor vent aperture for the second valve module.

7. The vent apparatus of claim 5, wherein each valve module has a float valve and a spring for the respective float valve to configure each valve module as a roll-over valve module, the float valve of the first valve module is movable in the first chamber to contact the first wall to block fuel from flowing through the first fuel vapor vent aperture, the spring of the second valve module contacts the first wall, and the float valve of the second valve module is movable in the second chamber to contact the second wall to block fuel from flowing through the second fuel vapor vent aperture.

8. The vent apparatus of claim 5, wherein the housing has a third chamber in communication with the fuel vapor vent outlet, the first fuel vapor vent aperture, and the second fuel vapor vent aperture.

9. A vent apparatus adapted for use with a fuel tank to control venting of fuel vapor from the fuel tank, the vent apparatus comprising:
a housing having a fuel vapor vent outlet to discharge fuel vapor from the fuel tank, a lower fuel vapor vent aperture, and an upper fuel vapor vent aperture,
a lower roll-over valve module associated with the lower fuel vapor vent aperture, and
an upper roll-over valve module associated with the upper fuel vapor vent aperture,
the lower roll-over valve module and the upper roll-over valve module being movable between a fill-limit orientation in which the lower roll-over valve module and the upper roll-over valve module cooperate to block communication between the fuel tank and the fuel vapor vent outlet through the lower fuel vapor vent aperture and the upper fuel vapor vent aperture when the level of liquid fuel in the fuel tank rises to a predetermined fill limit and a venting orientation in which the lower roll-over valve module blocks communication between the fuel tank and the fuel vapor vent outlet through the lower fuel vapor vent aperture and the upper roll-over valve module allows fuel vapor to flow from the fuel tank through the upper fuel vapor vent aperture to the fuel vapor vent outlet, wherein the housing has a first wall having the lower vent aperture and a liquid fuel transfer aperture for communication of liquid fuel between the lower roll-over valve module and the upper roll-over valve module.

10. The vent apparatus of claim 9, wherein the housing has a second wall above the first wall, the first wall has a lower valve seat including the lower fuel vapor vent aperture for the lower roll-over valve module, and the second wall has an upper valve seat including the upper fuel vapor vent aperture for the upper roll-over valve module.

11. A vent apparatus adapted for use with a fuel tank to control venting of fuel vapor from the fuel tank, the vent apparatus comprising:
a housing having a fuel vapor vent outlet to discharge fuel vapor from the fuel tank, a lower fuel vapor vent aperture, and an upper fuel vapor vent aperture,
a lower roll-over valve module associated with the lower fuel vapor vent aperture, and
an upper roll-over valve module associated with the upper fuel vapor vent aperture,
the lower roll-over valve module and the upper roll-over valve module being movable between a fill-limit orientation in which the lower roll-over valve module and the upper roll-over valve module cooperate to block communication between the fuel tank and the fuel vapor vent outlet through the lower fuel vapor vent aperture and the upper fuel vapor vent aperture when the level of liquid fuel in the fuel tank rises to a predetermined fill limit and a venting orientation in which the lower roll-over valve module blocks communication between the fuel tank and the fuel vapor vent outlet through the lower fuel vapor vent aperture and the upper roll-over valve module allows fuel vapor to flow from the fuel tank through the upper fuel vapor vent aperture to the fuel vapor vent outlet, wherein the housing has a wall having a valve seat including the lower fuel vapor vent aperture for the lower roll-over valve module and a thrust surface for the upper roll-over valve module.

12. The vent apparatus of claim 11, wherein each of the lower roll-over valve module and the upper roll-over valve module comprises a float valve and a spring upon which the float valve rests, the float valve of the lower roll-over valve module is movable to contact the valve seat of the wall, and the spring of the upper roll-over valve module contacts the thrust surface of the wall.

13. A vent apparatus adapted for use with a fuel tank to control venting of fuel vapor from the fuel tank, the vent apparatus comprising:
a housing having a fuel vapor vent outlet to discharge fuel vapor from the fuel tank, a lower fuel vapor vent aperture, and an upper fuel vapor vent aperture,
a lower roll-over valve module associated with the lower fuel vapor vent aperture, and
an upper roll-over valve module associated with the upper fuel vapor vent aperture,
the lower roll-over valve module and the upper roll-over valve module being movable between a fill-limit orientation in which the lower roll-over valve module and the upper roll-over valve module cooperate to block communication between the fuel tank and the fuel vapor vent outlet through the lower fuel vapor vent aperture and the upper fuel vapor vent aperture when the level of liquid fuel in the fuel tank rises to a predetermined fill limit and a venting orientation in which the lower roll-over valve module blocks communication between the fuel tank and the fuel vapor vent outlet through the lower fuel vapor vent aperture and the upper roll-over valve module allows fuel vapor to flow from the fuel tank through the upper fuel vapor vent aperture to the fuel vapor vent outlet, wherein the housing has an upper chamber for the upper roll-over valve module, a lower chamber for the lower roll-over valve module, and a liquid fuel transfer aperture for communication of liquid fuel between the upper chamber and the lower chamber, the upper chamber is associated with the upper fuel vapor vent aperture, and the lower chamber is associated with the lower fuel vapor vent aperture.

14. A vent apparatus adapted for use with a fuel tank to control venting of fuel vapor from the fuel tank, the vent apparatus comprising
a housing having a fuel vapor vent outlet to discharge fuel vapor from the fuel tank, a lower first chamber, a second chamber, an upper third chamber located above the lower first chamber, a first fuel vapor vent aperture for communication of fuel vapor between the first chamber and the second chamber, a second fuel vapor vent aperture for communication of fuel vapor between the second chamber and the third chamber, and a liquid fuel transfer aperture for communication of liquid fuel between the first chamber and the third chamber,
a first roll-over valve module positioned for movement in the first chamber between an opened position allowing fuel vapor to flow from the first chamber through the first fuel vapor vent aperture to the second chamber for discharge through the fuel vapor vent outlet and a closed position blocking fuel from flowing from the first chamber through the first fuel vapor vent aperture to the second chamber, and
a second roll-over valve module positioned for movement in the third chamber from an opened position allowing fuel vapor to flow from the third chamber through the second fuel vapor vent aperture to the second chamber for discharge through the fuel vapor vent outlet to a closed position blocking fuel from flowing from the third chamber through the second fuel vapor vent aperture to the second chamber in response to liquid fuel flowing from the first chamber through the liquid fuel transfer aperture to the third chamber.

15. The vent apparatus of claim 14, wherein the housing has a first wall positioned between the lower first chamber and the upper third chamber and between the lower first chamber and the second chamber, and the first wall has the first fuel vapor vent aperture and the liquid fuel transfer aperture.

16. The vent apparatus of claim 15, wherein the first wall has a valve seat including the first fuel vapor vent aperture for the first roll-over valve module.

17. The vent apparatus of claim 15, wherein the housing has a second wall positioned above the first wall, the second wall has a valve seat including the second fuel vapor vent aperture for the second roll-over valve module, and the second roll-over valve module engages the first wall.

18. The vent apparatus of claim 14, wherein the housing has an outer wall surrounding the first roll-over valve module and the second roll-over valve module, and the outer wall has a first port in communication with the first chamber and a second port in communication with the third chamber.

19. The vent apparatus of claim 14, wherein the liquid fuel transfer aperture is interposed between the first roll-over valve module and the second roll-over valve module so that the first roll-over valve module and the second roll-over valve module are positioned in series.

* * * * *